UNITED STATES PATENT OFFICE 2,298,169

MANUFACTURE OF DIPHENYLACETOPHENONE

Robert Robinson, Oxford, and Donald Mercer, Manchester, England, assignors to Imperial Chemical Industries Limited, a corporation of Great Britain No Drawing. Application November 4, 1941, Serial No. 417,854. In Great Britain October 30, 1940

3 Claims. (Cl. 260—590)

The present invention relates to a process for the production of diphenylacetophenone

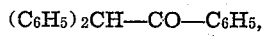

which is an intermediate useful for the manufacture of medicinal and other products.

According to the invention diphenylacetophenone is made by causing benzoin and benzene to interact in presence of a condensing agent as hereinafter defined.

According to the equation

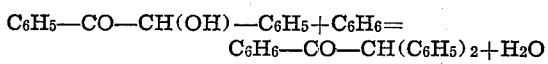

it should by theory be sufficient to bring into interaction with the benzoin an equimolecular proportion of benzene, but benzoin is a solid of M. P. 137° C., whereas benzene is a liquid of B. P. 80° C. and the two compounds do not readily mix at 80° C. or below in these proportions, so that such a process presents some mechanical difficulties and it is preferable to work in presence of a solvent or diluent. Benzene being cheap and easily recovered by distillation, an excess thereof can conveniently be used as the diluent.

The condensing agent to be used is taken from the following group of substances, namely, sulphuric acid (either in the form of monohydrate or the usual commercial concentrated acid of 98% strength or diluted with up to 30% of water), oleum, phosphorus pentoxide and chlorosulphonic acid.

The invention is carried into practice by mixing the reagents and heating the mixture for a sufficient time.

The following examples, in which parts are by weight, illustrate but do not limit the invention.

Example 1

21 parts of benzoin are dissolved in 78 parts of benzene and the solution is heated in a vessel provided with a reflux condenser. When the solution is boiling, 10 parts of 98% sulphuric acid are added, with stirring, and the mixture is maintained at the boil for 24 hours. It is then cooled to 60° C. and 15 parts of water at that temperature are added. The mixture is efficiently stirred and then is allowed to stand, whereupon it separates into two layers. The aqueous layer is rejected. 45 parts of benzene are distilled off from the residue and then 40 parts of methanol are added. A crystalline precipitate of diphenylacetophenone is formed. This is filtered off, washed with methanol and dried. It then has M. P. 135°–136° C.

Example 2

21 parts of benzoin are dissolved in 80 parts of benzene and the solution is stirred and brought to the boil under a reflux condenser. 15 parts of phosphorus pentoxide are added and the mixture is kept at the boil for 24 hours. It is then worked up by the method described in Example 1.

Example 3

21 parts of benzoin are dissolved in 80 parts of benzene. The solution is stirred and 13 parts of chlorosulphonic acid are gradually added. Reaction occurs, heat is generated and the liquid boiled and becomes dark reddish purple in colour. When all the chlorosulphonic acid has been added the mixture is boiled for a further 6 hours. It is then cooled and worked up by the method described in Example 1.

Example 4

21 parts of benzoin are dissolved in 76 parts of benzene and 8 parts of 20% oleum are added. The mixture is boiled for 24 hours, cooled and worked up as described in Example 1.

From the foregoing disclosure it will be recognised that the invention is susceptible of modification without departing from the spirit and scope thereof and it is to be understood that the invention is not restricted to the specific illustrations thereof hereinbefore given, but only as defined in the appended claims.

We claim:

1. Process for the manufacture of diphenylacetophenone which comprises causing benzene and benzoin to interact in presence of a strongly acid condensing agent capable of removing the elements of water, selected from the group consisting of sulphuric acid of 70% to 100% strength, oleum, phosphorus pentoxide and chlorosulphonic acid, the quantity of the condensing agent, in the case of those which are also sulfonating agents, being sufficient to absorb the water formed in the reaction but insufficient to effect sulfonation of the benzene employed.

2. Process as claimed in claim 1 wherein the interaction is carried out in presence of a solvent or diluent.

3. Process as claimed in claim 1 wherein an excess of benzene is used as a diluent.

ROBERT ROBINSON.
DONALD MERCER.

CERTIFICATE OF CORRECTION.

Patent No. 2,298,169.  October 6, 1942.

ROBERT ROBINSON, ET AL.

It is hereby certified that error appears in the printed specification of the above numbered patent requiring correction as follows: First column, line 13, for that portion of the formula reading "$C_6H_6$" read --$C_6H_5$--; and that the said Letters Patent should be read with this correction therein that the same may conform to the record of the case in the Patent Office.

Signed and sealed this 24th day of November, A. D. 1942.

(Seal)

Henry Van Arsdale,
Acting Commissioner of Patents.